US010030757B2

(12) United States Patent
Manzoor (10) Patent No.: US 10,030,757 B2
(45) Date of Patent: Jul. 24, 2018

(54) TORSIONAL VIBRATION DAMPER WITH AN INTERLOCKED ISOLATOR (71) Applicant: Suhale Manzoor, Plymouth, MI (US)

(72) Inventor: Suhale Manzoor, Plymouth, MI (US)

(73) Assignee: DAYCO IP Holdings, LLC, Troy, MI (US)

(*) Notice: Subject to any disclaimer, the term of this patent is extended or adjusted under 35 U.S.C. 154(b) by 89 days.

(21) Appl. No.: 14/789,099

(22) Filed: Jul. 1, 2015

(65) Prior Publication Data

US 2016/0003342 A1 Jan. 7, 2016

Related U.S. Application Data (60) Provisional application No. 62/019,869, filed on Jul. 1, 2014.

(51) Int. Cl.
  F16D 3/00     (2006.01)
  F16H 55/14    (2006.01)
  F16H 55/36    (2006.01)

(52) U.S. Cl.
  CPC ....... *F16H 55/36* (2013.01); *F16H 2055/366* (2013.01)

(58) Field of Classification Search
  CPC .. F16H 2055/366; F16H 55/36; F16F 15/126; F16F 15/1442; Y10T 74/2131

(Continued)

(56) References Cited

U.S. PATENT DOCUMENTS 1,872,136 A * 8/1932 Gibson ................ F16F 15/124
                                                464/71
2,204,953 A * 6/1940 Wittmer ............. B60B 17/0041
                                                105/131

(Continued)

FOREIGN PATENT DOCUMENTS

CN      102601267      7/2012
DE    202004021877 U1  2/2012

(Continued)

OTHER PUBLICATIONS

PCT, International Search Report and Written Opinion; Application No. PCT/US2015/034788 (dated Aug. 21, 2015).

(Continued)

*Primary Examiner* — Henry Y Liu
(74) *Attorney, Agent, or Firm* — FisherBroyles, LLP; Susan M. Oiler (57) ABSTRACT A crankshaft damper-isolator that includes a hub having an outer radial surface and an outermost radial surface spaced radially outward from the outer radial surface and thereby defining an annular receptacle therebetween, a pulley body having a belt engaging portion radially-concentric about the hub and a face guard that terminates in a central bore seated about the outer radial surface of the hub, a damper assembly disposed between the outermost radial surface of the hub and belt engaging portion of the pulley body, a back plate fastened to the hub, a first elastomeric isolator member encapsulated and interlocked in compression between the annular receptacle of the hub and a front face of the face guard of the pulley body, and a second elastomeric isolator member encapsulated and interlocked in compression between the back plate and a back face of the face guard of the pulley body.

13 Claims, 4 Drawing Sheets

(58) Field of Classification Search
USPC .......................................................... 474/94
See application file for complete search history.

(56) References Cited

U.S. PATENT DOCUMENTS

| | | | | |
|---|---|---|---|---|
| 2,672,907 | A * | 3/1954 | MacLean | B60B 9/10 152/41 |
| 2,674,897 | A * | 4/1954 | Heinish | F16H 55/50 152/41 |
| 3,479,907 | A * | 11/1969 | Hall | F16F 15/126 74/574.4 |
| 3,485,063 | A | 12/1969 | Behlmer | |
| 3,504,509 | A * | 4/1970 | Paulsen | F16D 3/58 464/85 |
| 4,041,803 | A * | 8/1977 | Goloff | 416/134 R |
| 4,355,990 | A * | 10/1982 | Duncan, Jr. | F16D 3/68 464/74 |
| 4,378,865 | A * | 4/1983 | McLean | F16F 15/1442 188/379 |
| 4,710,152 | A * | 12/1987 | Ichikawa | F16F 15/126 474/166 |
| 5,308,289 | A * | 5/1994 | Funahashi | F16F 15/126 188/379 |
| 5,377,962 | A * | 1/1995 | Ochs | F16F 15/126 267/141.3 |
| 5,405,296 | A * | 4/1995 | Cerny | F16F 15/126 464/89 |
| 5,452,622 | A * | 9/1995 | Fenelon | F16H 55/14 264/242 |
| 5,540,626 | A * | 7/1996 | Asai | F16F 15/124 474/178 |
| 5,562,544 | A * | 10/1996 | Ochs | F16F 15/1442 464/89 |
| 5,573,461 | A * | 11/1996 | Colford | F16D 3/62 464/83 |
| RE35,932 | E * | 10/1998 | Cerny | F16F 15/126 464/68.91 |
| 5,931,052 | A | 8/1999 | Zhao et al. | |
| 5,988,015 | A * | 11/1999 | Riu | F16F 15/124 464/90 |
| 6,026,709 | A * | 2/2000 | Depp | F16F 15/126 464/180 |
| 6,062,104 | A * | 5/2000 | Allport | F16F 15/124 192/66.1 |
| 6,065,943 | A * | 5/2000 | Suito | F04B 27/0895 417/362 |
| 6,106,421 | A * | 8/2000 | Graber | F16F 15/126 474/94 |
| 6,332,842 | B1 * | 12/2001 | Tabuchi | F16D 9/06 403/11 |
| 6,702,681 | B1 * | 3/2004 | Ochs | F16D 3/76 464/7 |
| 6,742,412 | B2 * | 6/2004 | Feldhaus | F16F 15/145 188/378 |
| 6,955,252 | B2 * | 10/2005 | Allport | F16D 3/12 192/41 R |
| 7,025,680 | B2 * | 4/2006 | Tabuchi | F16H 55/36 464/180 |
| 7,055,243 | B2 * | 6/2006 | Hodjat | B21D 53/261 29/892.11 |
| 7,204,772 | B2 * | 4/2007 | Huber | F16D 3/68 474/94 |
| 7,300,372 | B2 | 11/2007 | Riu | |
| 7,591,357 | B2 * | 9/2009 | Antchak | F16D 41/206 192/41 S |
| 7,658,127 | B2 | 2/2010 | Crist | |
| 7,713,156 | B2 * | 5/2010 | Sakura | F16H 7/06 474/156 |
| 7,850,557 | B2 * | 12/2010 | Moriya | F16H 55/36 464/90 |
| 7,891,475 | B2 | 2/2011 | Zhu et al. | |
| 7,892,124 | B2 * | 2/2011 | Hodjat | F16D 3/02 192/212 |
| 7,931,538 | B2 * | 4/2011 | Martinek | F16F 15/124 464/73 |
| 8,021,253 | B2 | 9/2011 | Dell et al. | |
| 8,038,554 | B2 * | 10/2011 | Watanabe | F16F 15/126 474/94 |
| 8,202,183 | B2 * | 6/2012 | Riu | F16D 41/203 474/70 |
| 8,231,488 | B2 * | 7/2012 | Amati | H02K 7/1012 474/166 |
| 8,302,753 | B2 | 11/2012 | Antchak et al. | |
| 8,313,400 | B2 | 11/2012 | Serkh et al. | |
| 8,506,434 | B2 * | 8/2013 | Harvey | F16D 47/02 192/41 R |
| 8,534,438 | B2 | 9/2013 | Antchak et al. | |
| 2003/0199348 | A1 * | 10/2003 | Huber | F16D 3/68 474/94 |
| 2004/0166974 | A1 * | 8/2004 | Hodjat | F16F 15/126 474/94 |
| 2006/0094547 | A1 | 5/2006 | Xu et al. | |
| 2006/0172832 | A1 * | 8/2006 | Watanabe | F16F 15/126 474/94 |
| 2006/0264282 | A1 * | 11/2006 | Moriya | F16H 55/36 474/94 |
| 2007/0037644 | A1 * | 2/2007 | Mevissen | F16D 7/022 474/70 |
| 2007/0209899 | A1 | 9/2007 | Liu et al. | |
| 2007/0249442 | A1 * | 10/2007 | Grunau | F16F 15/1442 474/94 |
| 2009/0000422 | A1 | 1/2009 | Christenson et al. | |
| 2009/0105021 | A1 * | 4/2009 | Amati | H02K 7/1012 474/94 |
| 2009/0223775 | A1 * | 9/2009 | Hodjat | F16D 3/02 192/41 S |
| 2009/0318252 | A1 * | 12/2009 | Riu | F16D 41/203 474/94 |
| 2010/0099527 | A1 * | 4/2010 | Rolando | F16F 15/1442 474/94 |
| 2011/0263365 | A1 * | 10/2011 | Mende | F16F 15/1297 474/94 |
| 2012/0015768 | A1 * | 1/2012 | Serkh | F16H 55/36 474/94 |
| 2012/0094791 | A1 * | 4/2012 | Lee | F16F 15/126 474/94 |
| 2012/0149511 | A1 | 6/2012 | Hodjat | |
| 2012/0172163 | A1 * | 7/2012 | Fitz | F16F 15/1245 474/94 |
| 2012/0231909 | A1 * | 9/2012 | Shin | F16F 15/126 474/94 |
| 2013/0284139 | A1 | 10/2013 | Staley | |
| 2016/0153542 | A1 | 6/2016 | Wick et al. | |

FOREIGN PATENT DOCUMENTS

| EP | 1645783 | 4/2006 |
|---|---|---|
| EP | 2392834 A1 | 12/2011 |
| JP | 2007-333166 | 12/2007 |
| JP | 2013-036530 | 2/2013 |
| WO | 2002/086342 A1 | 10/2002 |
| WO | 2008/047046 A1 | 4/2008 |
| WO | 2014/152465 | 9/2014 |

OTHER PUBLICATIONS

U.S. Notice of Allowance, U.S. Appl. No. 14/734,750 (dated Dec. 16, 2016).

EP, Supplemental Search Report; European Application No. 15807406.2 (dated Feb. 19, 2018).

JP; Japanese Office Action with English Translation; Japanese Application No. 2016-572242 (dated May 21, 2018).

* cited by examiner

TORSIONAL VIBRATION DAMPER WITH AN INTERLOCKED ISOLATOR

RELATED APPLICATIONS

This application claims the benefit of U.S. Provisional Application No. 62/019,869, filed Jul. 1, 2014, the entirety of which is incorporated herein by reference.

TECHNICAL FIELD

The present invention relates to torsional vibration dampers for vehicle engines and, more particularly, to torsional vibration dampers having a dual common vertex style rubber isolator spring that does not require being molded, bonded, or adhered to another component of the damper.

BACKGROUND

Originally, a crankshaft drove the front end assembly drive (FEAD) system of an engine. The crankshaft was turned by the firing of pistons, which exerted a rhythmic torque on the crankshaft, rather than being continuous. This constant application and release of torque caused vacillations, which would stress the crankshaft to the point of failure. Stated another way, the crankshaft is like a plain torsion-bar, which has a mass and a torsional spring rate, that causes the crankshaft to have its own torsional resonant frequency. The torque peaks and valleys, plus the inertia load from the acceleration of the reciprocating components, causes the crankshaft itself to deflect (rotationally) forward and backward while it is operating. When those pulses are near the crankshaft resonant frequency, they would cause the crank to vibrate uncontrollably and eventually break. Accordingly, a torsional vibration damper (sometimes referred to as a crankshaft damper) is mounted on the crankshaft to solve this problem by counteracting torque to the crank, negating the torque twisting amplitude placed upon the crankshaft by periodic firing impulses, and to transfer rotational motion into the FEAD system, typically by driving an endless power transmission belt.

While existing torsional vibration dampers have been effective to extend the life of the crankshaft and to drive the FEAD system, changes in vehicle engine operation such as the introduction of start-stop systems to conserve fuel consumption add complexities to the system that the existing torsional vibration dampers are not designed to address. For instance, the start-stop system introduces impact forces due to belt starts that introduce the potential slip in the elastomer-metal interface in traditional torsion vibration dampers. Another concern is maintaining good axial and radial run-outs between the metallic components.

Some torsional vibration dampers also include an isolator system. Some of these isolator systems use a rubber spring for isolation as well as one for the vibration damper. Typically, these isolators are mold-bonded to another component of the torsional vibration damper. Mold-bonding adds expense to the manufacturing process by requiring special equipment and time to accomplish the molding process. Elimination of this step or requirement would be beneficial.

Traditional torsional vibration damper isolators have a rubber spring either in pure shear or in tension and compression. Both do not afford the stability that is required to hold the joint together axially. Accordingly, improved designs for torsional vibration dampers having isolators are needed.

SUMMARY

The limitations disclosed in the background section are overcome in the disclosed torsional vibration dampers having an interlocked isolator by putting the spring(s) under compression in both directions, axial and torsional. The compression of the spring(s) in both directions makes the damper very stiff in the axial direction while allowing it to be relatively softer in the torsional direction.

In one aspect, the torsional vibration dampers are referred to as crankshaft damper-isolators when mounted on a crankshaft. So using this embodiment as illustrative, the crankshaft damper-isolator includes a hub having an outer radial surface and an outermost radial surface spaced radially outward from the outer radial surface and thereby defining an annular receptacle therebetween, a pulley body having a belt engaging portion radially-concentric about the hub and, extending radially inward from the belt engaging portion, a face guard that terminates in a central bore seated about the outer radial surface of the hub, a damper assembly disposed between the outermost radial surface of the hub and belt engaging portion of the pulley body, a back plate fastened to the hub, a first elastomeric isolator member encapsulated and interlocked between the annular receptacle of the hub and a front face of the face guard of the pulley body and compressed therebetween, and a second elastomeric isolator member encapsulated and interlocked between the back plate and a back face of the face guard of the pulley body and compressed therebetween. Additionally, there may be a compressing member fastening the back plate to the hub, which, in one embodiment, is threadedly connected to the hub.

In one aspect, the damper assembly disposed between the outermost radial surface of the hub and belt engaging portion of the pulley body has an elastomeric damper member disposed in contact with the outermost radial surface of the hub, and an inertia member seated against the elastomeric damper member. The elastomeric damper member operably couples the inertia member to the hub for rotation therewith.

In another aspect, the crankshaft damper-isolators include an anti-misalignment feature. In one embodiment, the pulley body includes a pin that is received in a slot defined by the hub. In another embodiment, the pulley body includes a double flange defining its central bore. The double flange has a width in the axial direction that fills the gap, in the axial direction, between the hub and the back plate.

The first elastomeric isolator member of the crankshaft damper-isolators may be an annular member having one or more keys or keyways that interlock the first elastomeric isolator member to the hub and/or the pulley body. Also, the second elastomeric isolator member may be an annular member having one or more keys or keyways that interlock the second elastomeric isolator member to the pulley body and/or the back plate.

These crankshaft damper-isolators, with the interlocked isolator, are cheaper and easier to manufacture and assemble. The crankshaft damper-isolator has a first and a second elastomeric isolator member encapsulated between components of the damper, which may be metallic parts, and interlocked therewith to create a mechanical lock and isolate the engine vibrations. The elastomeric isolator members therefore do not have to be mold-bonded to any metallic components and include a compressing member that fastens the other components to the hub and compresses both of the first and second elastomeric members.

In another aspect, a front end accessory drive system that includes any one of the crankshaft damper-isolators disclosed herein mounted to a crankshaft for rotation therewith is desired.

In yet another aspect, methods of assembling a crankshaft damper-isolator are described. The method includes providing a hub having an outer radial surface and an outermost radial surface spaced radially outward from the outer radial surface and thereby defining an annular receptacle therebetween, seating a first elastomeric isolator member in the annular receptacle of the hub, providing a pulley body having a belt engaging portion radially-concentric about the hub and, extending radially inward from the belt engaging portion, a face guard that terminates in a central bore seated about the outer radial surface of the hub, seating a second elastomeric isolator member against the pulley body on a surface opposite the first elastomeric isolator member, seating a back plate against the second elastomeric isolator member, and fastening the back plate to the hub in a position that compresses the first elastomeric isolator member and the second elastomeric isolator member. The method may also include placing an inertia member between the outermost radial surface of the hub and the belt engaging portion of the pulley body, and operatively coupling the inertial member to the outermost radial surface of the hub with an elastomeric damper member.

In one embodiment, the elastomeric damper member is press fit between the outermost radial surface of the hub and the inertia member.

In one embodiment, seating the pulley body includes aligning an anti-misalignment feature of the pulley body with a mating anti-misalignment feature of the hub. The anti-misalignment feature of the pulley body may be a pin extending axially toward the hub.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 1:
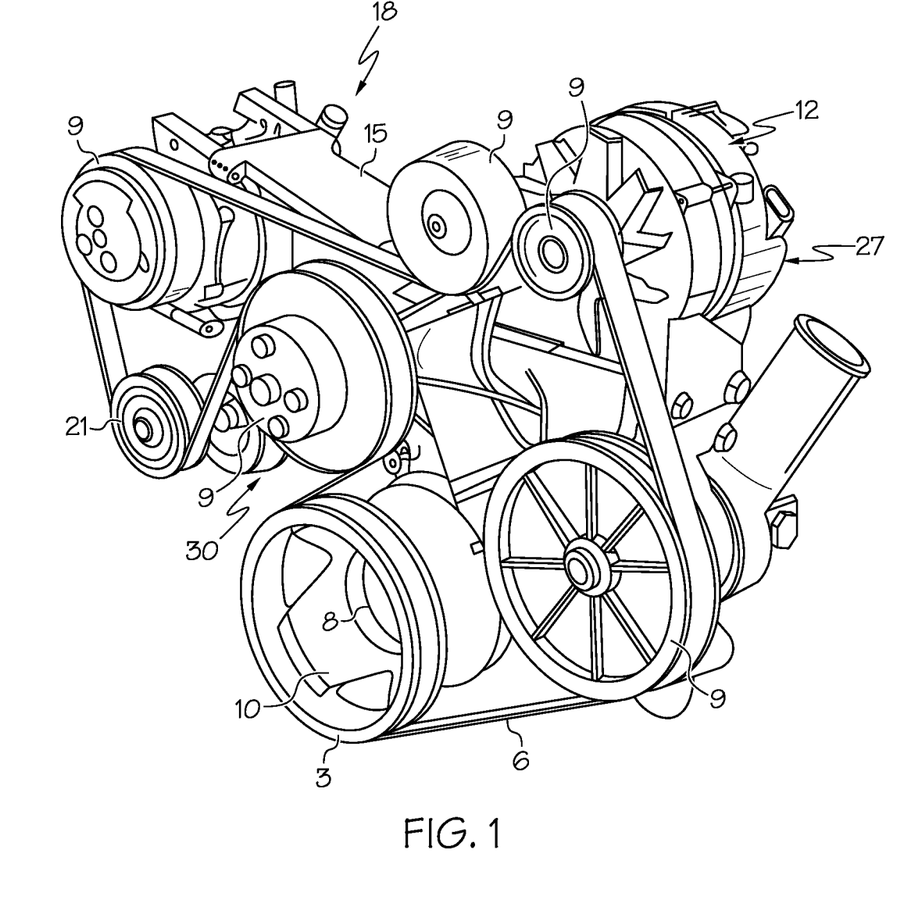
FIG. 1 is a perspective view of components in a front end accessory drive.

Referring now to FIG. 1, an example of one embodiment of a FEAD system 18 is shown, merely for illustration purposes, that includes an integrated housing 15, having a front surface 30 and a rear surface 27. The rear surface 27 of the integrated housing 15 is preferably mounted to an engine. The FEAD system 18 may be utilized with any engine, including vehicle, marine and stationary engines. The shape and configuration of the integrated housing 15 depends upon the vehicle engine to which it is to be mounted. Accordingly, the integrated housing 15 and more specifically the FEAD system 18 may vary along with the location of engine drive accessories 9 and still achieve the objects of the present invention. It should be understood that the location and number of engine drive accessories 9 may be varied. For example, a vacuum pump, a fuel injection pump, an oil pump, a water pump, a power steering pump, an air conditioning pump, and a cam drive are examples of other engine drive accessories 9 that may be mounted on the integrated housing 15, for incorporation into the FEAD system 18. The engine drive accessories 9 are preferably mounted to the integrated housing 15 by bolts or the like at locations along the surface that are tool accessible for easy mounting and also service accessible. In FIG. 1, the integrated housing 15 has a plurality of engine drive accessories 9, including an alternator 12 and a belt tensioner 21.

The engine drive accessories 9 are driven by at least one endless drive belt 6, which may be a flat belt, a rounded belt, a V-belt, a multi-groove belt, a ribbed belt, etc., or a combination of the aforementioned belts, being single or double sided. The endless drive belt 6 may be a serpentine belt, and is wound around the engine drive accessories 9, the alternator 12 and the torsional vibration damper 3, which is connected to the nose 10 of the crankshaft 8. The crankshaft drives the torsional vibration damper 3 and thereby drives the endless drive belt 6, which in turn drives the remaining engine drive accessories 9 and the alternator 12. The belt tensioner 21 automatically adjusts the tension of the endless drive belt 9 to keep it tight during operation and also prevent wear.

Figure 2:
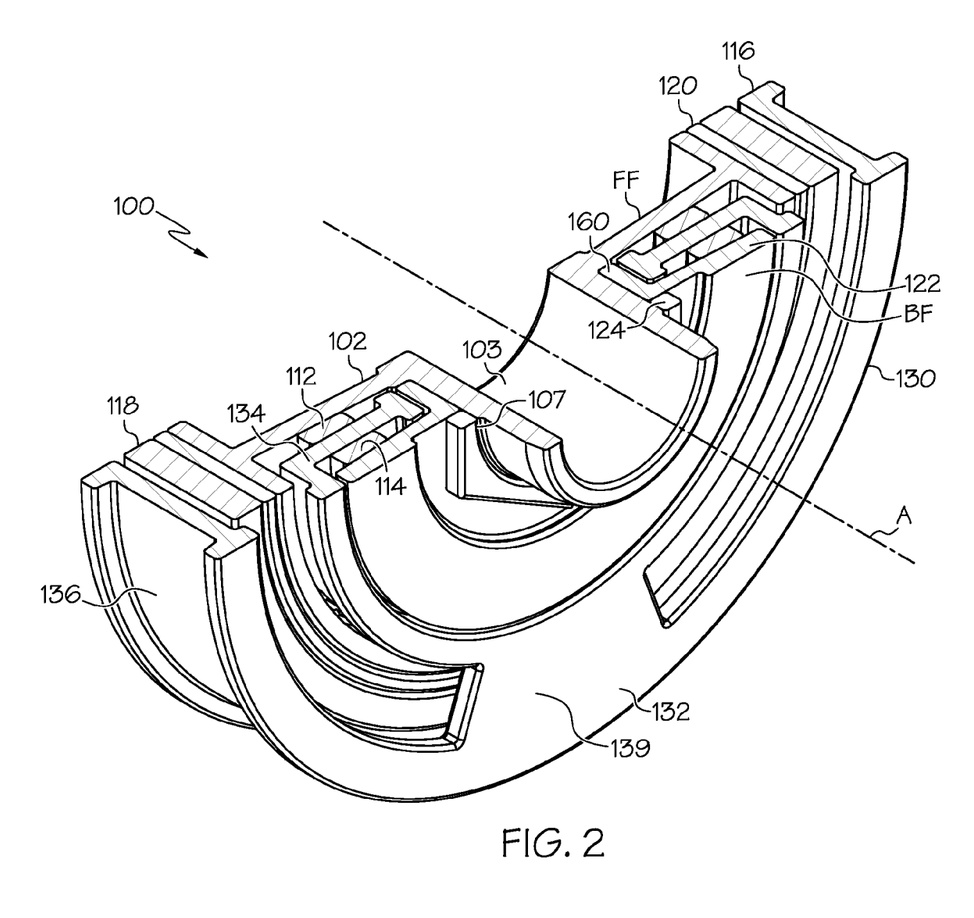
FIG. 2 is a longitudinal cross-section view of a torsional vibration damper having a dual common vertex isolator taken through and parallel with the axis of rotation.
Figure 3:
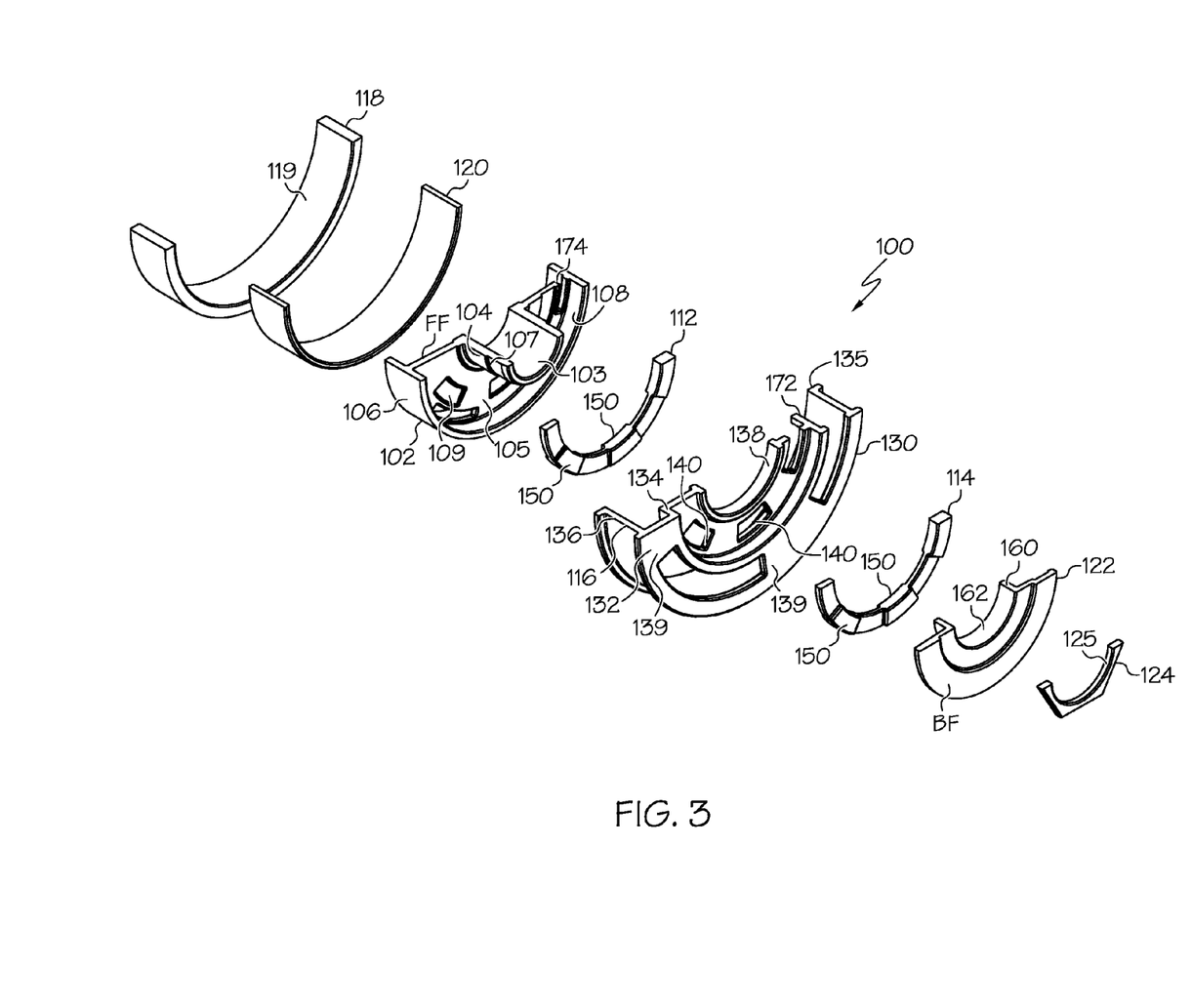
FIG. 3 is an exploded, perspective view of the torsional vibration damper of FIG. 2.

The improvement to the FEAD system 18 herein is a new crankshaft damper-isolator, generally designated by reference 100 in FIGS. 2 and 3. The crankshaft damper-isolator 100 as seen in FIG. 3 includes from left to right, relative to the orientation of the drawing on the page, an inertia member 118, an elastomeric damper member 120, a hub 102, a first elastomeric isolator member 112, a pulley body 116, a second elastomeric isolator 114, a back plate 122 and a locking nut 124. The hub 102 is mountable to a crankshaft by receiving the crankshaft through its central bore 103. As depicted, the isolator member, which may be considered a spring, includes the first and second elastomeric isolator members 112 and 114 compressed between the hub 102 and the back plate 122 by tightening the locking nut 124 onto the hub 102. The elastomeric material that these elastomeric isolator members are comprised of, thus, does not have to be mold bonded to any metallic components of the damper and is simultaneously rigid in the axial direction while providing the necessary flexibility in the torsional direction to function as an isolator.

Still referring to FIGS. 2 and 3, the hub 102 has an outer radial surface 104 defining the central bore 103 that includes threading 107 and has an outermost radial surface 106 spaced radially outward from the outer radial surface 104 by a plate 105 to thereby define an annular receptacle 108 therebetween. The hub 102 may be cast, spun, forged, machined, or molded using known or hereinafter developed techniques. Suitable material for the hub includes iron, steel, aluminum, other suitable metals, plastics, or a combination thereof, including composite materials. The plate 105 may, as seen in FIG. 3, define one or more apertures or recesses 109. The recesses 109 may each be arcuate since, after assembly of the crankshaft damper-isolator, these recesses receive a portion of the elastomeric isolator member 112, which is an annular member. While the plate 105 is illustrated as having recesses 109, the plate 105 could instead have one or more protrusions for mating with the elastomeric isolator member 112 along a side thereof or through a hole therein. As seen in FIG. 2, the portion of the hub 102 defining the central bore 103 may extend axially in only one direction from the plate 105. Here, the plate 105 defines a front face FF of the crankshaft damper-isolator 100, which will receive the nose seal 10 (FIG. 1) fastening the crankshaft damper-isolator 100 to a shaft, such as a crankshaft, for rotation therewith.

The opposing face of the crankshaft damper-isolator 100, the back face BF, is defined by a first tier 132 of the face guard 130 portion of the pulley body 116 and the back plate 122 that is seated in a second tier 134 of the face guard 130 portion of the pulley body 116. As depicted in FIG. 3, in addition to the face guard 130, the pulley body 116 includes a belt engaging portion 135 and a central bore 138, which passes through the second tier 134 of the face guard 130. The belt engaging portion 135 is an outer radial member positioned radially outward relative to the central axis of rotation A of the crankshaft damper-isolator 100 that includes an outer belt engaging surface 136, which may be flat, contoured to receive a rounded belt, or have V-grooves for mating with the V-ribs of a V-ribbed belt or any other required contoured groove to mate with an endless belt.

The face guard 130 may be attached to the belt engaging portion 118 by a plurality of spokes 139, which can reduce material costs. The face guard 130 may define one or more apertures or open windows 140 in the second tier 134 thereof for mating with the first and second elastomeric isolator members 112, 114 on opposing faces thereof, i.e., in FIGS. 2 and 3 the first elastomeric member 112 is on the front face and the second elastomeric member 114 is on the back face thereof. The open windows 140 may each be arcuate since they receive a portion of the first and second elastomeric isolator members 112, 114, which are each an annular member. While the second tier 124 of the face guard 130 is illustrated as having open windows 140, the face guard 130 could instead have one or more keyways or protrusions for mating and interlocking with the first and second elastomeric isolator member 112, 114. Moreover, while open windows 140 are depicted in the figures, in another embodiment, the face guard 130 could instead have recesses in the front face and in the back face thereof that do not pass therethrough.

Figure 4:
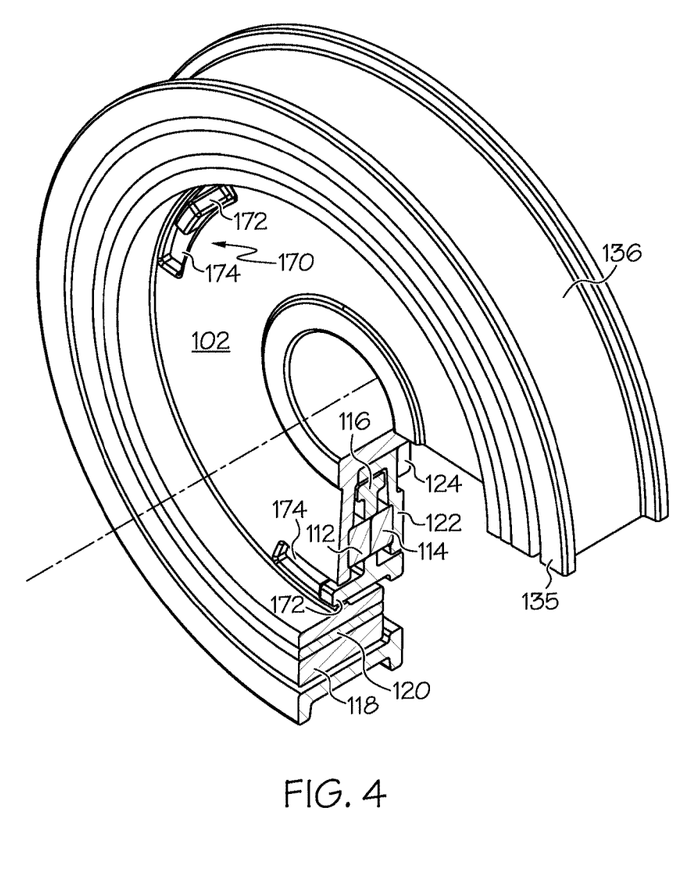
FIG. 4 is a partial cut-away, perspective view of the torsional vibration damper of FIG. 2 from the front face.

As shown in FIG. 4, the pulley body 116 also includes one or more anti-misalignment features 170 that limit the rotation thereof in a non-torsional direction, if such forces are exerted by the system. These anti-misalignment features 170 can be designed with any shape or size having selected tolerances as long as they do not interfere when the isolator spring is torsionally excited, but as soon as there is a non-torsional load that acts on the system, the anti-misalignment features 170 provide mechanical stops and do not allow rotation of the pulley body that would be detrimental to the device. Referring now to FIGS. 3 and 4, each anti-misalignment feature 170 includes a pin 172 on the pulley body 116 received in a slot 174 in the hub 102. The slot 174 may be generally arcuate. Another anti-misalignment feature is the double flange that defines the central bore 138 of the pulley body 116. This double flange is one that has a first flange portion extending toward the front face and a second flange portion extending toward the back face. The double flange defining the central bore 138 is wide enough in the axial direction to fill the gap, in the axial direction, between the hub 102 and the back plate 122.

The first and second elastomeric isolator members 112, 114, as best seen in FIG. 3, each include or define one or more keys or protrusions 150 in both the front face and the back face thereof While the protrusions 150 are illustrated as generally rectangular, arcuate notches, the protrusions are not limited thereto. The protrusions may have any configuration suitable to interlock the first and second elastomeric isolator members 112, 114 with the hub 102 and the pulley body 116 and with the pulley body 116 and the back plate 122, respectively, for rotation together. Moreover, rather than having protrusions, the first and second elastomeric isolator members 112, 114 could instead have one or more keyways shaped for mating with keys of the hub 102 and the pulley body 116 and the pulley body 116 and the back plate 122, respectively, and vice versa.

The elastomeric isolator members 112, 114 can be constructed using any geometry and/or material as long as it provides the requisite torsional stiffness to function as an isolator of vibrations and it is successfully interlocked to the hub 102 and the pulley body 116 and the pulley body 116 and the back plate 122. Here, the first and second elastomeric isolator members 112, 114 are both in compression between the members of the damper. In FIGS. 2 and 3, the first and second elastomeric isolator members 112, 114 are each a single annular member, but are not limited thereto. In another embodiment, the isolator members may comprise two or more elastomeric members, for example, a larger O-ring and a smaller O-ring, with respect to their inner diameters.

The back plate 122 includes recesses (not shown) similar to those described above for the hub 102, but in the front face thereof that faces the hub, and includes axially extending flange 160 defining a central bore 162 thereof The flange 160, in the assembled crankshaft damper-isolator 100, is disposed between the outer radial surface 104 of the hub 102 and the central bore 138 of the pulley body 116 and the back plate 122 is seated on the second tier 134 of the pulley body 116. The flange 160 of the back plate 122 may be press-fit onto the hub 102 and is rotatable therewith.

FIGS. 2 and 3 depict a locking nut 124 having threading 125 as a compressing member that places the first and second elastomeric isolator members 112, 114 in compression. In another embodiment, rather than the locking nut 124, the compressing member may be a set of fasteners that pull the back plate 122 and the hub 102 together as they exert the compression on the first and second elastomeric isolator members 112, 114. For example, the fasteners may be a plurality of shoulder bolts.

Still referring to FIGS. 2 and 3, the crankshaft damper-isolator 100 includes an elastomeric damper member 120 disposed in contact with the outermost radial surface 106 of the hub and an inertia member 118 seated against the elastomeric damper member 120 thereby operably coupling the inertia member 118 to the hub 102 for rotation therewith. The inertia member 118 may be made from any material having a sufficient inertia, usually cast iron, steel, or similar dense material. As illustrated in FIG. 2, the inertia member 118 is concentric with and spaced radially outward from the hub 102 such that the outermost radial surface 106 of the hub faces an inner surface 119 of the inertia member 118 and defines a gap therebetween. The elastomeric damper member 120 may be press fit or injected into this gap so as to non-rigidly couple the hub 102 and the inertia member 118.

The elastomeric damper member 120 may be any suitable elastomer to absorb and/or damp the torsional vibrations generated by a rotating shaft upon which the crankshaft damper-isolator 100 is mounted. The elastomeric members may have a generally low tensile modulus and high yield strain. The elastomer is preferably one suitable for automotive engine applications, i.e., suitable to withstand temperatures experienced in the engine and road temperatures and conditions. The elastomeric damper member 120 may, however, be as disclosed in U.S. Pat. No. 7,658,127, which is incorporated herein, in its entirety, by reference. In one embodiment, the elastomer members may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomeric member may be a composite material that optionally includes a plurality of fibers dispersed therein. The fibers may be continuous or fragmented (chopped) aramid fiber like the fiber sold under the name TECHNORA® fiber. In one embodiment, the elastomeric damper member 120 may be attached to the outermost radial surface 106 using a conventional adhesive known for use in vibration damping systems. Some examples of suitable adhesives include rubber bonding adhesives sold by the Lord Corporation, Henkel AG & Co., or Morton International Incorporated Adhesives & Specialty Company.

Once assembled, as shown in FIG. 2, the elastomeric damper member 120 and the inertia member 118 are disposed between the outermost radial surface 106 of the hub 102 and the belt engaging portion 135 of the pulley body 116, the first elastomeric isolator member 112 is encapsulated and interlocked between the annular receptacle 108 of the hub 102 and the front face of the second tier 134 of the face guard 130 of the pulley body 116, and the second elastomeric isolator member 114 is encapsulated and interlocked between the back face of the second tier 134 of the face guard 130 and the front face of the back plate 122. This places the belt engaging portion 135 of the pulley body 116 radially-concentric about the hub 102, and the central bore 138 of the pulley body 116 about the outer radial surface 104 of the hub 102. As noted above, the encapsulation of the first and second elastomeric isolator members 112, 114 is in a compressed state.

The crankshaft damper-isolator disclosed herein eliminates mold-bonding and interlocks the elastomeric isolator members with the other components of the damper so that the elastomeric isolator members do not rotate relative to the other components, but rotate with the other components. The crankshaft damper-isolator disclosed herein also eliminates the need for a bearing system to prevent misalignment of the pulley to isolator system within the damper.

Although the invention is shown and described with respect to certain embodiments, it is obvious that modifications will occur to those skilled in the art upon reading and understanding the specification, and the present invention includes all such modifications.

What is claimed is:

1. A crankshaft damper-isolator comprising:
   a hub having an outer radial surface and an outermost radial surface spaced radially outward from the outer radial surface and thereby defining an annular receptacle therebetween;
   a pulley body having a belt engaging portion radially-concentric about the hub and, extending radially inward from the belt engaging portion, a face guard that terminates in a central bore seated about the outer radial surface of the hub;
   a damper assembly disposed between the outermost radial surface of the hub and belt engaging portion of the pulley body;
   a back plate fastened to the hub;
   a first elastomeric isolator member encapsulated and interlocked between the annular receptacle of the hub and a front face of the face guard of the pulley body and compressed therebetween, wherein the first elastomeric isolator member is an annular member having one or more keys or keyways in both the front face and the back face thereof that interlock the first elastomeric isolator member to an opposing one or more keys or keyways in the hub and/or the pulley body;
   a second elastomeric isolator member encapsulated and interlocked between the back plate and a back face of the face guard of the pulley body and compressed therebetween, wherein the second elastomeric isolator member is an annular member having one or more keys or keyways in both the front face and the back face thereof that interlock the second elastomeric isolator member to opposing one or more keys or keyways in the pulley body and/or the back plate; and
   a compressing member tightenable to move the back plate toward the hub to place the first and second elastomeric isolator members in axial compression therebetween and fasten the pulley body to the hub for rotation therewith.

2. The crankshaft damper-isolator of claim 1, wherein the damper assembly comprises:
   an elastomeric damper member disposed in contact with the outermost radial surface of the hub; and
   an inertia member seated against the elastomeric damper member thereby operably coupling the inertia member to the hub for rotation therewith.

3. The crankshaft damper-isolator of claim 1, wherein the pulley body includes an alignment feature.

4. The crankshaft damper-isolator of claim 3, wherein the alignment feature comprises a pin defined by the pulley body received in a slot defined by the hub.

5. The crankshaft damper-isolator of claim 3, wherein the alignment feature comprises a double flange defining the bore of the pulley body and having a width in the axial direction that fills the gap, in the axial direction, between the hub and the back plate.

6. The crankshaft damper-isolator of claim 1, wherein the compressing member is threadedly connected to the hub.

7. A front end accessory drive system comprising the crankshaft damper-isolator of claim 1 mounted to a crankshaft for rotation therewith.

8. The crankshaft damper-isolator of claim 1, wherein the compressing member is a locking nut seated about and connected to the outer radial surface of the hub.

9. A crankshaft damper-isolator comprising:
   a hub having an outer radial surface and an outermost radial surface spaced radially outward from the outer radial surface and thereby defining an annular receptacle therebetween;
   a pulley body having a belt engaging portion radially-concentric about the hub and, extending radially inward from the belt engaging portion, a face guard that terminates in a central bore seated about the outer radial surface of the hub, and an alignment feature;

a damper assembly disposed between the outermost radial surface of the hub and belt engaging portion of the pulley body;

a back plate fastened to the hub;

a first elastomeric isolator member encapsulated and interlocked between the annular receptacle of the hub and a front face of the face guard of the pulley body and compressed therebetween; and a second elastomeric isolator member encapsulated and interlocked between the back plate and a back face of the face guard of the pulley body and compressed therebetween;

wherein the alignment feature comprises a double flange defining the bore of the pulley body and having a width in the axial direction that fills the gap, in the axial direction, between the hub and the back plate.

10. The crankshaft damper-isolator of claim 9, further comprising a compressing member fastening the back plate to the hub, wherein the first and second isolator members are not mold-bonded to the pulley body, the hub, or the back plate.

11. The crankshaft damper-isolator of claim 10, wherein the compressing member is threadedly connected to the hub.

12. The crankshaft damper-isolator of claim 11, wherein the compressing member is a locking nut seated about and threadedly connected to the outer radial surface of the hub.

13. The crankshaft damper-isolator of claim 8, wherein the locking nut is threadedly connected to the hub.

* * * * *